(12) United States Patent
Anderson et al.

(10) Patent No.: US 12,272,254 B2
(45) Date of Patent: Apr. 8, 2025

(54) COMMUNICATION MANAGEMENT UNIT (CMU) BASED SUPPORT FOR AUTOMATED DEPENDENT SURVEILLANCE-CONTRACT (ADS-C) FULFILLMENT

(71) Applicant: Rockwell Collins, Inc., Cedar Rapids, IA (US)

(72) Inventors: Eric N. Anderson, Marion, IA (US); Timothy R. Fannin, Urbana, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 328 days.

(21) Appl. No.: 17/688,713

(22) Filed: Mar. 7, 2022

(65) Prior Publication Data
US 2023/0282118 A1    Sep. 7, 2023

(51) Int. Cl.
G08G 5/00    (2006.01)

(52) U.S. Cl.
CPC ........... *G08G 5/003* (2013.01); *G08G 5/0004* (2013.01); *G08G 5/0017* (2013.01); *G08G 5/0047* (2013.01)

(58) Field of Classification Search
CPC .... G08G 5/003; G08G 5/0004; G08G 5/0017; G08G 5/0047
See application file for complete search history.

(56) References Cited

U.S. PATENT DOCUMENTS

| | | | |
|---|---|---|---|
| 8,463,535 B2 | 6/2013 | Torres et al. | |
| 8,560,148 B2 * | 10/2013 | Torres | G08G 5/0039 701/3 |
| 8,798,898 B2 | 8/2014 | Castillo-Effen et al. | |
| 9,530,323 B1 * | 12/2016 | Maji | G08G 5/0008 |
| 10,055,997 B2 | 8/2018 | Judy et al. | |
| 10,102,754 B2 | 10/2018 | Judd et al. | |
| 10,425,505 B2 | 9/2019 | McGuffin | |

(Continued)

FOREIGN PATENT DOCUMENTS

EP    3796289 A1 *    3/2021    ........... G08G 5/0013

OTHER PUBLICATIONS https://www.duncanaviation.aero/files/straight-talk/Straight_Talk-FANS.pdf.

*Primary Examiner* — Yazan A Soofi
*Assistant Examiner* — Ahmed Alkirsh
(74) *Attorney, Agent, or Firm* — Suiter Swantz IP

(57) ABSTRACT

A system and method for offloading Future Air Navigation System (FANS) and Automated Dependent Surveillance-Contract (ADS-C) functionality from the flight management system (FMS) to an aircraft-based communications management unit (CMU) receives intent data outputs from the FMS, each intent data output including aircraft state and trajectory intent data. Based on the received intent data outputs, the CMU generates a dynamic route representation approximating the aircraft route, inferring and connecting waypoints without otherwise querying the FMS or the pilot for additional data. The CMU receives inbound messages related to ADS-C contracts established with the aircraft by air traffic control (ATC) ground stations and, based on the dynamic route, generates and transmits any necessary ADS-C reports to the ATC ground stations. Further, the CMU queries aircraft-based absolute and relative navigational systems to verify navigational system availability and accuracy status with each ADS-C report.

18 Claims, 8 Drawing Sheets

(56) References Cited

U.S. PATENT DOCUMENTS

| | | | |
|---|---|---|---|
| 10,565,886 B2* | 2/2020 | Chikkegowda | G08G 5/0021 |
| 2013/0080043 A1* | 3/2013 | Ballin | G08G 5/0034 |
| | | | 701/120 |
| 2014/0200752 A9 | 7/2014 | Lacombe et al. | |
| 2016/0176538 A1* | 6/2016 | Bekanich | H04B 7/18506 |
| | | | 701/14 |
| 2017/0018191 A1* | 1/2017 | Idupunur | G01C 21/20 |
| 2021/0090445 A1* | 3/2021 | Molnar | G08G 5/0039 |

\* cited by examiner

410 — Assessing, via the aircraft-based CMU and independent of the FMS, a navigational accuracy of the aircraft by querying one or more of an aircraft-based absolute positioning system and an aircraft-based inertial reference system

412 — Detecting, via the CMU and based on the at least one dynamic route, at least one contract event defined by the at least one ADS-C event contract between the aircraft and the at least one ground station, the at least one contract event corresponding to a deviation by the aircraft beyond a parameter set by the ADS-C event contract

*FIG. 4C*

COMMUNICATION MANAGEMENT UNIT (CMU) BASED SUPPORT FOR AUTOMATED DEPENDENT SURVEILLANCE-CONTRACT (ADS-C) FULFILLMENT

BACKGROUND

Access to certain preferred high level aviation routings, such as the North Atlantic High-Level Airspace (NAT HLA) requires support for Future Air Navigation System (FANS) 1/A communications protocols such as Automated Dependent Surveillance-Contract (ADS-C). ADS-C and Controller Pilot Data Link Communication (CPDLC) are the two primary components of FANS. ADS-C is similar to Automated Dependent Surveillance-Broadcast (ADS-B) in that ADS-C provides regular updates about the aircraft's position and/or route, but ADS-C differs from ADS-B by operating on the basis of contracts established with an aircraft by air traffic control (ATC). Contracts specify various ways by which ATC will receive updates from the aircraft.

Conventional approaches to FANS 1/A are offered by aircraft original equipment manufacturers (OEM) and are hosted in the Flight Management System (FMS). While FMS-based solutions meet operational requirements, FANS 1/a functionality significantly increases resource demands on the FMS and provides only a single aircraft-specific solution for each aircraft type, resulting in increased costs to airlines and training differences in operational behavior across aircraft types.

SUMMARY

In a first aspect, an aircraft-based communications management unit (CMU) configured for real-time Automated Dependent Surveillance-Contract (ADS-C) fulfillment is disclosed. In embodiments, the CMU includes an input for receiving intent data outputs from the flight management system (FMS) via a trajectory bus, each intent data output including aircraft state data (e.g., 4D position and ETA) and trajectory intent data (e.g., trajectory points indicative of a lateral or vertical flight path transition). CMU processors maintain a dynamic route representation based on the received intent data outputs, the dynamic route inferring and connecting flight path waypoints based on trajectory intent data. Based on the dynamic route representation, the CMU generates and transmits ADS-C reports to ground-based control station/s in fulfillment of ADS-C contracts between the aircraft and the ground station/s, each ADS-C report including at least current aircraft state data (position, altitude, ETA). The CMU received ADS-C messages and requests, and transmits ADS-C reports, via an Aircraft Communications Addressing and Reporting System (AC-ARS)-compatible communications interface.

In some embodiments, the intent data outputs include trajectory points corresponding to flight path waypoints, e.g., air traffic service (ATS) waypoints having a fixed location and coordinates; inserted waypoints added to the flight plan by the FMS, and dynamic or pseudo waypoints indicative of a programmed change in flight parameters.

In some embodiments, the CMU is in communication with aircraft-based navigational systems (e.g., GNSS receivers and other absolute position systems, air data inertial reference units (ADIRU) and other relative navigational systems), and queries each navigational system, e.g., for availability and/or accuracy. Accordingly, each ADS-C report including a navigational status accuracy report.

In some embodiments, the ADS-C report is a periodic ADS-C report transmitted in fulfillment of an ADS-C contract providing for transmission of ADS-C report data at a predetermined reporting rate.

In some embodiments, the ADS-C report is transmitted in fulfillment of an ADS-C event contract providing for the transmission of ADS-C report in response to one or more specific flight events, which flight events are detected by the CMU based on the received intent data outputs.

In some embodiments, the ADS-C report is transmitted in fulfillment of an ADS-C demand contract received from the ground station/s, whereby the CMU generates and transmits a specific ADS-C report demanded by the ground station.

In some embodiments, the ADS-C demand contracts requests a projected state or position of the aircraft at a subsequent time, and the CMU determines the projected position at the subsequent time based on the dynamic route.

In some embodiments, the CMU determines and transmits via ADS-C report a projected route of the aircraft to the determined projected (e.g., future) position at the subsequent time, the projected route including a set of intermediate points between the current aircraft state and the projected future position In a further aspect, a method for Automated Dependent Surveillance-Contract (ADS-C) fulfillment via an aircraft-based CMU is also disclosed. In embodiments, the method includes receiving, via the CMU through a trajectory bus connecting the CMU to the aircraft flight management system (FMS), intent data outputs from the FMS, each intent data output including aircraft state data (e.g., 4D position and ETA of the aircraft) and trajectory intent data (e.g., one or more trajectory points indicative of a lateral or vertical flight path transition). The method includes generating and maintaining, via the received intent data outputs, a dynamic route representation approximating the actual route of the aircraft without querying the FMS or pilot for additional data, the dynamic route connecting each received aircraft state. The method includes, based on the dynamic route, generating ADS-C reports in fulfillment of an ADS-C contract between the aircraft and one or more ground stations, each ADS-C report based at least on an aircraft state received via the set of intent data outputs. The method includes transmitting each ADS-C report to the appropriate ground station/s.

In some embodiments, the method includes identifying, within the set of received intent data outputs (e.g., the set of trajectory points included therein), flight plan waypoints including: air traffic service (ATS) waypoints having a fixed location and coordinates; inserted waypoints added to the flight plan by the FMS, and dynamic or pseudo waypoints corresponding to programmed changes in flight parameters.

In some embodiments, the method includes assessing, via the CMU, availability and accuracy of aircraft navigational systems (e.g., GNSS receivers and other absolute position receivers, air data inertial reference units (ADIRU) and other relative navigational systems) and including with each ADS-C report a navigational accuracy status report.

In some embodiments, the method includes generating and transmitting ADS-C reports at a predetermined reporting rate in fulfillment of a periodic ADS-C contract.

In some embodiments, the method includes detecting, based on the dynamic route, specific flight events and generating ADS-C reports responsive to the detected flight events in fulfillment of an ADS-C event contract.

In some embodiments, the method includes receiving, via the CMU, ADS-C demand contracts from the ground station/s and generating in response ADS-C reports fulfilling the specific information requests of the demand contract.

In some embodiments, the method includes determining, via the CMU, a projected position of the aircraft at a subsequent time requested by an ADS-C contract, and generating an ADS-C report including a projected future state or position of the aircraft at the subsequent time.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 4A through 4C are flow diagrams illustrating a method ADS-C fulfillment via aircraft-based CMU according to example embodiments of this disclosure.

DETAILED DESCRIPTION

Figure 1:
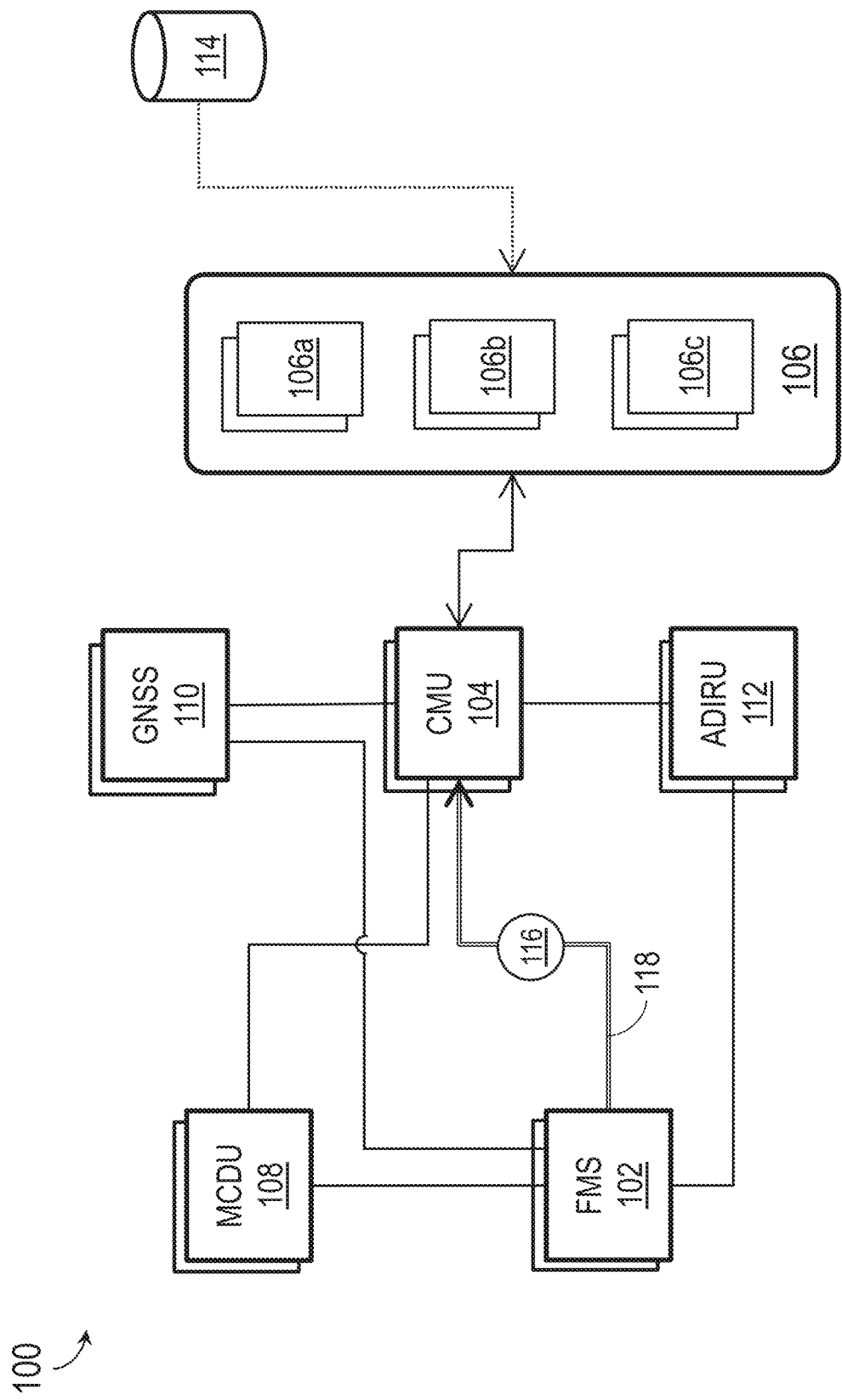
FIG. 1 is a block diagram illustrating an aircraft environment configured for Future Air Navigation System (FANS 1/A) and Automated Dependent Surveillance-Contract (ADS-C) functionality via an aircraft-based communications management unit (CMU) according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, an aircraft 100 is disclosed. The aircraft 100 may include flight management system 102 (FMS); communications management unit 104 (CMU); datalink radios 106; multifunction control and display unit 108 (MCDU); absolute positioning systems (e.g., Global Navigation Satellite System (GNSS) receiver 110); and inertial reference systems (e.g., air data inertial reference unit 112 (ADIRU)). One or more of the aforementioned components, e.g., the FMS 102, GNSS receiver 110, and/or ADIRU 112, may include backup or redundant systems aboard the aircraft 100.

In embodiments, the FMS 102 may automate inflight tasks as necessary and manage the fulfillment of the flight plan by the aircraft 100, displaying flight plan data to the pilots and accepting control input from the pilots via the MCDU 108. For example, the FMS 102 may determine position information of the aircraft 100 based on data sensed by the GNSS receiver 110 and/or ADIRU 112. The FMS 102 may maintain and consult navigation data, waypoint data associated with fixes and navigational aids, terrain data associated with conditions and obstacles along the flight plan, weather and atmospheric data, and other flight plan components, updating this data (as well as the flight plan) based on new information (e.g., as received from ATC ground stations 114 or as input by the pilots).

In embodiments, the CMU 104 and datalink radios 106 may manage and execute uplink and downlink communications between the aircraft 100 and ATC control stations 114. For example, datalink radios may include, but are not limited to, VHF components 106a for communications in the VHF band (c. 30-200 MHz); HF components 106b for communications in the HF band (c. 3-30 MHz); and/or satellite communications (SATCOM) components 106c. In embodiments the CMU 104 may route any received messages (e.g., from ATC ground stations 114, from proximate aircraft) to their intended destinations.

In embodiments, the GNSS receiver 110 may determine high integrity position data of the aircraft 100 (e.g., an absolute position relative to an earth or world frame) based on positioning signals received from navigational satellites (e.g., GPS, GLONASS, Beidou, Galileo, IRNSS, QZSS). In embodiments, the ADIRU 112 may provide the FMS 102 with inertial navigation data (e.g., a relative position and/or orientation of the aircraft 100 in multiple degrees of freedom) and air data (e.g., airspeed, barometric/pressure altitude, angle of attack).

Broadly speaking, embodiments of the inventive concepts disclosed herein are directed to a CMU 104 (and methods of operation thereof) capable of offloading FANS 1/A functionality from the FMS 102 based on trajectory intent data outputs received therefrom. For example, the CMU 104 may "intercept" trajectory intent data outputs from the FMS 102 and, based on these trajectory intent data outputs, independently determine dynamic trajectory, routing, or intent information required by ADS-C contracts between the aircraft 100 and ATC ground stations 114, transmitting to the ATC ground stations ADS-C reports including any position and trajectory information associated with the fulfillment of ADS-C contracts. Similarly, the CMU 104 may receive, and fulfill as described above, any new ADS-C contracts initiated by the ATC ground stations 114. In embodiments, while position and trajectory data independently determined by the CMU 104 may not directly correspond to flight plan data housed in the FMS 102 (e.g., as the CMU 104 will not have direct access to this flight plan data), the CMU 104 may fulfill any ADS-C contracts with position and trajectory data in compliance with ADS-C accuracy standards. For example, any dynamic route data determined by the CMU 104 may be accurate within 4 NM (as required by ADS-C) and provided to the relevant ATC ground stations 114 in timely fashion.

Conventional FANS 1/A solutions provide that the CMU 104 receive any inbound ADS-C messages transmitted by ARC ground stations 114 and route any received messages to the FMS 102. The FMS 102 would generate responses to received ADS-C messages (e.g., requests for specific information) for transmission to the ground station/s 114 via the CMU 104. Further, the FMS 102 would generate intent data outputs 116, or ADS-C reports including current position and trajectory information of the aircraft 100. Such intent data outputs 116 are intended for periodic transmission (e.g., every half second (0.5 s) or event-based transmission (e.g., in response to a flight plan event), as provided for by ARINC specification 702A-1) and would be received by the CMU 104 for transmission via trajectory bus 118, along with any other ADS-C reports generated by the FMS 102 (e.g., in response to demands received via the CMU 104).

In embodiments, the CMU 104 may "intercept" each intent data output 116 sent by the FMS 102 via the trajectory bus 118. For example, the CMU 104 may receive intent data outputs 116 sent by the FMS via the trajectory bus 118, whether periodic or event-driven. However, in embodiments the CMU 104 may "intercept" and process any ADS-C messages received from ATC ground stations 114, e.g., rather than routing said ADS-C messages to the FMS 102 for processing. For example, each intent data output 116 received by the CMU 104 via the trajectory bus 118 may include a state of the aircraft 100 at a particular timestamp, e.g., a four-dimensional (4D) position and track of the aircraft comprising a latitude, longitude, and altitude of the aircraft and an estimated time of arrival (ETA) at the destination provided for by the flight plan (e.g., based on the current airspeed of the aircraft and according to the current flight plan). Further, each intent data output 116 may include intent path information comprising one or more trajectory points. For example, each trajectory point may correspond to a transition point or track change in the flight plan, e.g., a lateral path transition or a vertical path transition. Lateral path transitions may include: "fly by" and "fly over" (e.g., relative to a waypoint of fixed location ("fix")); "hold (pattern)", "proc(edure) hold", "proc(edure) turn" (e.g., special approach and landing procedures); "radius to fix (RF) leg" (e.g., an arcuate course relative to a fix and at a specified radius therefrom). Intent data outputs 116 including a lateral path transition may further include a turn direction and turn radius (e.g., indicative of the aircraft 100 flying clockwise or counterclockwise relative to, and at a fixed radius from, a waypoint or fix). Similarly, vertical path transitions may include "top climb" and "top desc(ent)" (e.g., indicative of the aircraft 100 either transitioning from a climb segment to level flight or from level flight to an initial descent); "start of level (flight)"; "crossover altitude" (e.g., an altitude at which airspeed corresponds to a specific Mach number), and "transition altitude" (e.g., an altitude above which aircraft altitude is expressed in terms of Flight Level (FL)).

In embodiments, the CMU 104 may generate a dynamic route (e.g., route representation) by correlating the set of intent data outputs 116 to approximate the route of the aircraft 100 (e.g., including trajectory points) without reference to the flight plan and without otherwise querying the FMS 102 or the pilot/s for information. For example, the CMU 104 may convert each latitude, longitude, and altitude of the aircraft 100 into a range, bearing, and altitude relative to a defined point or fix and corresponding to a state of the aircraft 100 at the time indicated by the timestamp of the intent data output 116. In embodiments, by intercepting and correlating every intent data output 116 sent by the FMS 102 via the trajectory bus 118, the CMU 104 may dynamically simulate the route of the aircraft 100 in real time or near real time with sufficient positional accuracy to generate and transmit ADS-C reports as required by any contracts extant between the aircraft 100 and the ATC ground stations 114.

In embodiments, offloading of high demand ADS-C report processing to the CMU 104 may reduce demand on the FMS 102, allowing FMS processing resources to be reallocated for navigation, flight optimization, or other purposes. Similarly, the CMU 104 may process rapid responses to ADS-C requests for information without the need to compete for FMS 102 processing time with system-critical flight control calculations. Further, overall flight control system architecture and interfaces may be simplified and made easier to maintain.

In embodiments, ADS-C contracts may be established by one or more ATC ground stations 114 and accepted by the aircraft 100. In embodiments, every ADS-C report generated and transmitted by the CMU 104 may include a "basic group", or the minimum required information: a latitude, longitude, and altitude of the aircraft 100, a timestamp, and a navigational accuracy status report (e.g., a figure of merit (FOM) assessing the current accuracy of all navigational and positioning systems aboard the aircraft on a scale of zero to seven (e.g., and based on the operating accuracy and/or redundancy of the GNSS receivers 110, ADIRU 112, and their respective backup systems). Accordingly, in embodiments the CMU 104 may be in communication with all GNSS receivers 110 and ADIRUs 112 aboard the aircraft 100 (e.g., and any other like navigational equipment, e.g., Traffic Collision Avoidance System (TCAS)) and may continually assess the accuracy and redundancy of aircraft navigation systems (e.g., that the main and backup GNSS receivers, and/or main and backup ADIRUs, and TCAS are operational and to what level of accuracy). For example, every ADS-C report generated by the CMU 104 (basic or otherwise) may include a navigational status accuracy report, e.g., an estimated position uncertainty of navigational solutions based on the availability of, and state information provided by, onboard GNSS receivers 110 and/or ADIRUs 112 (main and/or backup). In selected high-level airspaces, continual verification of navigational status accuracy may serve as continuing assurance by the aircraft 100 that its navigational systems are sufficiently accurate to remain within the high-level airspace through which the aircraft is navigating.

In embodiments, ADS-C contracts received and accepted by the CMU 104 may be characterized as periodic contracts, event contracts, or demand contracts. For example, a periodic contract may specify information to be provided (e.g., a "basic group" report and/or additional by-request data groups as specified by the ATC ground station 114) and a reporting rate specifying the frequency at which the requested information is to be transmitted. Additional by-request data groups may include: flight identification (e.g., identifying a flight number or route segment); earth reference (e.g., true track, ground speed, vertical rate); air reference (e.g., true heading, airspeed/Mach number, vertical rate); airframe identification (e.g., 24-bit ICAO address unique to the aircraft 100); meteorological (e.g., wind speed, wind direction, air temperature); predicted route; and fixed or intermediate projected intent. In embodiments, with respect to the latter two groups the CMU 104 may, based on the dynamic route, predict a future position of the aircraft 100 as described in greater detail below.

In embodiments, event contracts may specify the generation and transmission of an ADS-C report by the CMU 104 whenever a predetermined event occurs. For example, the event contract may specify one or more parameters associated with performance of the aircraft 100 along its flight plan, with an event corresponding to the exceeding or deceeding by the aircraft of any specified parameter, e.g., vertical rate change (the rate of climb/descent of the aircraft exceeds the predetermined rate); lateral deviation (the actual position of the aircraft sufficiently deviates from its expected position according to the flight plan); altitude range change (the altitude of the aircraft exceeds a ceiling or floor relative to the cleared FL); or waypoint change (a change to an ATC or inserted waypoint, as described in greater detail below).

In embodiments, demand contracts may be associated with singular requests for specific information by the ATC ground station/s 114. For example, the CMU 104 may receive the demand contract as a message from the ATC ground station/s 114 and may respond by generating and transmitting a "basic group" ADS-C report as described above.

In embodiments, the CMU 104 may include an Aircraft Communication Addressing and Reporting System (ACARS) compatible interface configured for transmission of datalink messages in text format between the aircraft 100 and the ATC ground station/s 114. Accordingly, the CMU 104 may generate and transmit any ADS-C reports according to the ACARS protocol defined in ARINC specification 618.

Figure 2:
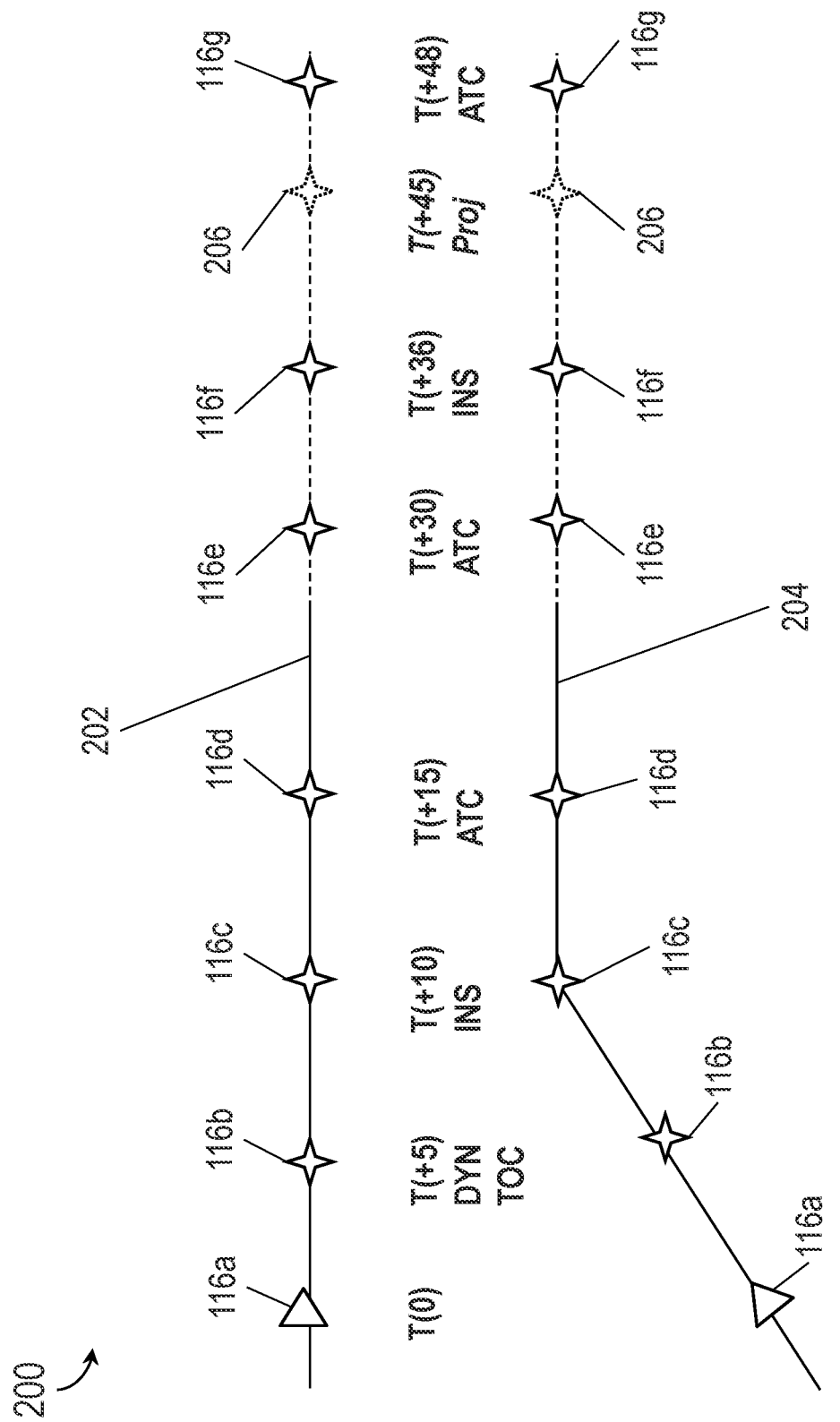
FIG. 2 is a diagrammatic illustration of a dynamic trajectory set generated by the CMU of FIG. 1.

Referring to FIG. 2, a dynamic route 200 is shown. In embodiments, the dynamic route 200 may be generated by the CMU (104, FIG. 1) based on intent data outputs (116, FIG. 1) received from the FMS (102, FIG. 1) via the trajectory bus (118, FIG. 1).

In embodiments, the dynamic route 200 may be constructed by the CMU 104 by arranging the received intent data outputs 116*a-g* in space and time, and projecting a route or path connecting each pair of consecutive intent data outputs, e.g., based on the path transition indicated by each intent data output. For example, each intent data output 116*a-g* may correspond to an aircraft state at a particular time (e.g., either the current state of the aircraft 100 according to the most recent timestamp, or a future state of the aircraft at a projected time according to the flight plan). The intent data output 116*a*, for example, may correspond to a current state of the aircraft 100, e.g., its most recent latitude, longitude, and altitude as the aircraft climbs to cruising altitude. In embodiments, the dynamic route 200 may incorporate a projected lateral path 202 (associated with the trajectory of the aircraft 100 through xy-space) and/or a projected vertical path 204 (associated with the altitude and orientation of the aircraft through the various segments of the flight plan, e.g., takeoff, climb, cruise, descent, landing).

In embodiments, each intent data output 116*a-g* may correspond to a path transition, to a waypoint, or both. For example, waypoints may include ATC waypoints, inserted waypoints, and dynamic or pseudo-waypoints. In embodiments, ATC waypoints (e.g., "fixes") may correspond to a fixed geographic location, may be defined by absolute coordinates (e.g., latitude/longitude) and/or relative coordinates (e.g., distance and bearing from a radio navigation (RNAV) beacon), and may be informally referred to in voice communications by pilots by distinct five-letter terms (e.g., CANIO, AANDY, GEEZR). For example, ATC waypoints may be used for navigation via Instrument Flight Rules (IFR) or other RNAV procedures and may define approach patterns to airports and runways. "Fly-over" ATC waypoints must be vertically crossed by the aircraft 100, and "fly-by" ATC waypoints generally mark a path transition, e.g., from a first lateral track to a second lateral track, such that the aircraft "flies by" the waypoint in turning from the first track to the second. For example, the intent data outputs 116*d*, 116*e*, and 116*g* may correspond to ATC waypoints which the aircraft 100 is projected to fly-by or fly-over at future times projected by the flight plan.

Similarly, inserted waypoints may be inserted into the flight plan (e.g., by the pilot, via the MCDU 108) to trigger a report by the FMS 102 (and therefore an intent data output 116). Dynamic waypoints, or pseudo-waypoints, may be inserted into the flight plan by the FMS 102 and may be updated by the FMS based on the actual path of the aircraft 100 (e.g., as opposed to the expected path of the aircraft per the flight plan). For example, dynamic waypoints may correspond to state transitions according to flight parameters, e.g., a top of climb (TOC) or top of descent (TOD). For example, the trajectory intent data output 116*b* may correspond to a dynamic TOC point wherein the aircraft 100 levels off from its climb segment to cruise at altitude, and the intent data outputs 116*c*, 116*f* may correspond to other inserted waypoints.

Accordingly, in embodiments the CMU 104 may infer a waypoint based on an intent data output based on a variety of factors, e.g., a geographical location or altitude not already achieved by the aircraft 100 along the flight plan (implying a future location or altitude) or a path transition as described above. For example, the projected lateral and vertical paths 202, 204 may connect a set of waypoints based on the intent data output 116*b* corresponding to a TOC point (e.g., implying a transition between climb and cruise segments with respect to the projected vertical path). In embodiments, the projected vertical and lateral paths 202, 204 may not correspond exactly to the flight plan, but may represent the construction by the CMU 104 of a reasonable approximation or representation of the active route of the aircraft 100 (e.g., sufficiently accurate to fulfill ADS-C reporting requirements) based on received intent data outputs 116a-g without querying the FMS 102 or the pilot for additional information.

In embodiments, each intent data output 116b-g may correspond to a projected time subsequent to a current time associated with the current state of the aircraft 100 (e.g., intent data output 116a). For example, each intent data output 116b-g may be timestamped by the FMS 102, e.g., based on the current airspeed or according to the flight plan, and some intent data outputs (e.g., corresponding to dynamic waypoints) may be updated with more accurate timestamps as the aircraft 100 approaches the said dynamic waypoints, or as the FMS 102 is updated to changing atmospheric or traffic conditions.

In embodiments, the intent data outputs 116b, 116c, 116d, 116e, 116f, 116g may each correspond to projected times T(+5), T(+10), T(+15), T(+30), T(+36), and T(+48) respectively, where X (T+X) is a relative number of minutes ahead of the current time T(0) corresponding to the intent data output 116a. Similarly, the CMU 104 may convert the absolute coordinates (e.g., latitude, longitude, altitude) of each intent data output 116a-116g to relative coordinates (distance, bearing, altitude) relative to a defined point. For example, based on relative time and distance information for each intent data output 116a-116g, the CMU 104 may infer an average speed between each consecutive pair of waypoints.

In embodiments, the ATC ground station (114, FIG. 1) may request via ADS-C contract a predicted route including absolute position data corresponding to the next two ATS or inserted waypoints from the flight plan. For example, the CMU 104 may respond to this request with an ADS-C report including, according to a timestamp, the latitude, longitude, and altitude the inserted waypoint and ATC waypoint corresponding to intent data outputs 116c, 116d.

In embodiments, the CMU 104 may further project a state or position of the aircraft 100 at other points along the dynamic route 200, e.g., in fulfillment of an ADS-C contract requesting a projected intent of the aircraft 100. For example, an ATC ground station (114, FIG. 1) may request via ADS-C contract a fixed projected intent, or a projected position of the aircraft 100 at a projected subsequent time T(+X) which may or may not correspond to any identified waypoint of the dynamic route 200. In embodiments, if the fixed projected intent request corresponds to a time T(+45), or 45 minutes into the future, the CMU 104 may interpolate, based on the straight track and average speed between the waypoints corresponding to intent data outputs 116f, 116g at T(+36) and T(+48) respectively, a fixed projected intent (e.g., projected point) 206 at T(+45).

Similarly, in embodiments the CMU 104 may receive a request via ADS-C contract for an intermediate projected intent of the aircraft 100. For example, the CMU 104 may generate and transmit an ADS-C report identifying not only the fixed projected intent/projected point 206 at T(+45), but a series of eligible waypoints between the current position/state (intent data output 116a) of the aircraft 100 and the fixed projected intent, e.g., any of all of the ATC, dynamic, or inserted waypoints corresponding to the intent data outputs 116b-116f.

In embodiments, the CMU 104 may detect one or more events associated with the fulfillment of an event contract, generating and transmitting an ADS-C report indicative of the detected event. For example, based on changes in position or altitude between intent data outputs 116a-116g (e.g., either between consecutive intent data outputs or cumulative changes over a series of intent data outputs), the CMU 104 may detect vertical rate changes, lateral deviations, or altitude range changes in excess of parameters provided for by the received ADS-C event contract, and may generate and transmit ADS-C reports documents any such detected events. Similarly, based on trajectory intent data (e.g., trajectory points) provided by the received intent data outputs 116a-116g, the CMU 104 may detect waypoint sequencing changes by the FMS 102 (e.g., changes to next or next-plus-one waypoints indicative of a waypoint change event).

Figure 3A:
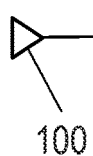
FIGS. 3A through 3H are diagrammatic illustrations of dynamic trajectory sets generated by the CMU of FIG. 1.

Referring to FIG. 3A, the dynamic route 200a may be implemented and may function similarly to the dynamic route 200 of FIG. 2, except that the dynamic route 200a may incorporate a lateral track change 302 between the waypoints corresponding to intent data outputs 116c and 116d.

In embodiments, similarly to the dynamic route 200 of FIG. 2, the CMU 104 may determine a projected point (e.g., fixed projected intent 206) between the "fly-over" waypoint corresponding to intent data output 116c and the "fly-by" waypoint corresponding to intent data output 116d (e.g., a projected point corresponding to a subsequent projected time T(+X) wherein the intent data outputs 116c, 116d respectively correspond to projected times T(+[X−m]) and T(+[X+n])), based on nominal performance associated with the aircraft 100. For example, if the aircraft 100 is established by the CMU 104 to be cruising at altitude, the projected point 206 at projected time T(+X) may be determined in terms of linear progression based on nominal turn rates at cruising altitude (e.g., assuming the aircraft has been established by the CMU to be cruising at altitude).

Figure 3B:
Figure 3C:
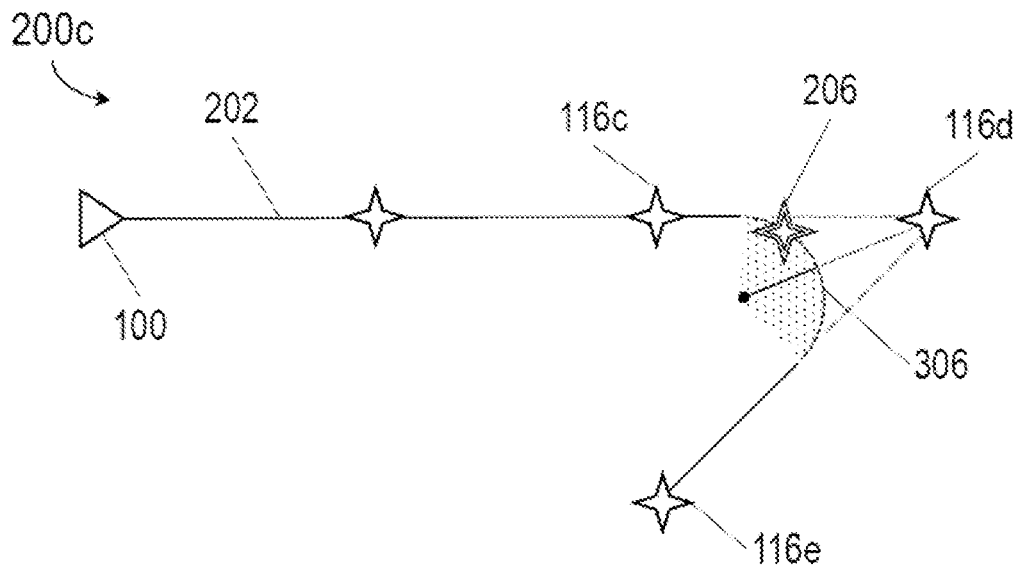
Figure 3D:
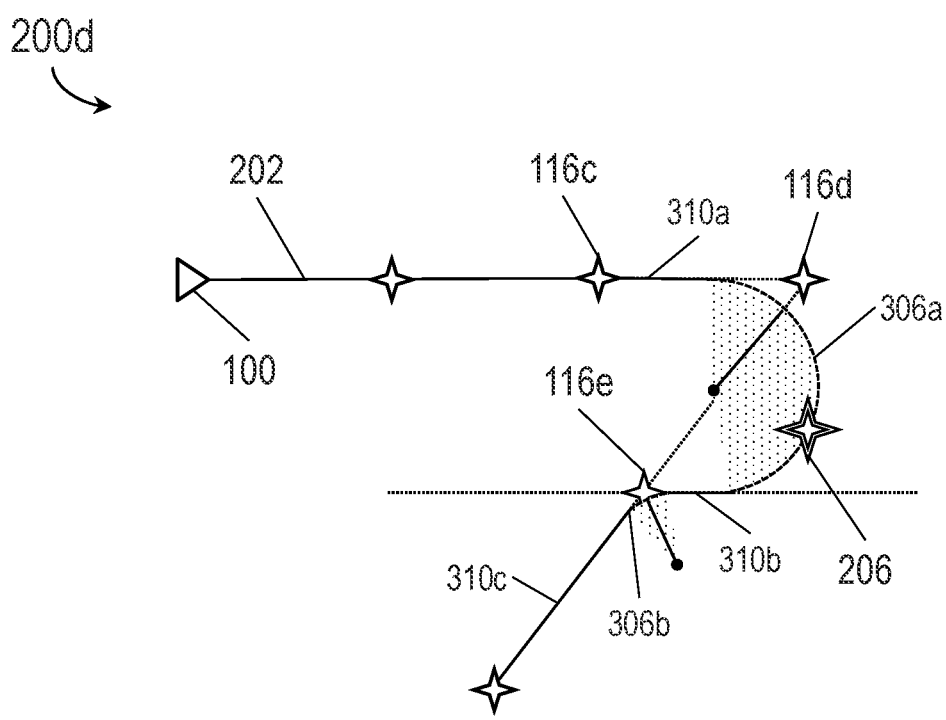

Referring also to FIGS. 3B through 3D, the dynamic routes 200b-200d, waypoints corresponding to intent data outputs 116c and 116e, and the "fly-by" waypoint corresponding to intent data output 116d are respectively shown. In embodiments, the dynamic route 200b may be associated with a projected lateral path 202 indicative of a track change 306 of up to 90 degrees between the waypoints corresponding to intent data outputs 116b and 116c. For example, any projected point 206 between the waypoints corresponding to intent data outputs 116c, 116d or between the waypoints 1 corresponding to intent data outputs 16d, 116e may be interpolated by the CMU 104 according to an arcuate track change 306 (e.g., associated with a turn radius 308) tangent to straight lateral track segments 310a, 310b (and, e.g., based on nominal turn rate at cruising altitude or the appropriate flight segment).

In embodiments, referring in particular to FIG. 3C, the dynamic route 200c may be associated with a projected lateral path 202 indicative of a track change 306 of c. 90 to 135 degrees between the waypoints corresponding to intent data outputs 116c and 116e, and the projected point 206 may be interpolated similarly to the dynamic route 200b.

In embodiments, referring in particular to FIG. 3D, the dynamic route 200d may be associated with a projected lateral path 202 indicative of a track change 306 of c. 135 degrees or greater between the waypoints corresponding to intent data outputs 116c and 116e, and the projected point 206 may be interpolated based on multiple arcuate track changes 306a, 306b and straight lateral track segments 310a, 310b, 310c (along which the CMU 104 may apply straight linear progression, as described above with reference to the dynamic route 200a of FIG. 3A).

Referring also to FIGS. 3E through 3H, the dynamic routes 200e, 200f, 200g, and 200h are shown. In embodiments, more complex dynamic routes and projected points 206 may be interpreted by the CMU 104 as sequences or sets of component lateral straight and arcuate path segments 310, 306 as described above with respect to FIGS. 3B through 3D.

Figure 3E:
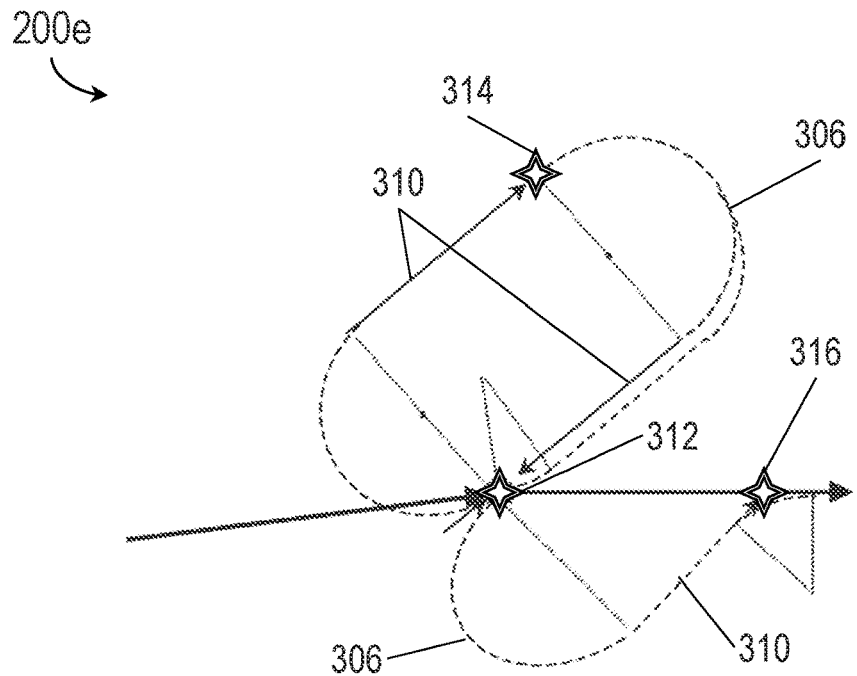

Referring in particular to FIG. 3E, in embodiments the dynamic route 200e may be associated with a holding pattern (e.g., type "hold", "hold at", "hold pattern") defined by entry/exit waypoint 312, "fly-over" waypoint 314, and subsequent waypoint 316 associated with a projected time after the aircraft 100 has left the holding pattern. For example, the projected point 206 may be interpolated based on substantially semicircular arcuate track changes 306 connected by substantially straight linear track segments 310, and, e.g., whether the projected point is between the entry point 312 and waypoint 314, between the waypoint 314 and exit point 312, or between the exit point 312 and subsequent waypoint 316.

Figure 3F:
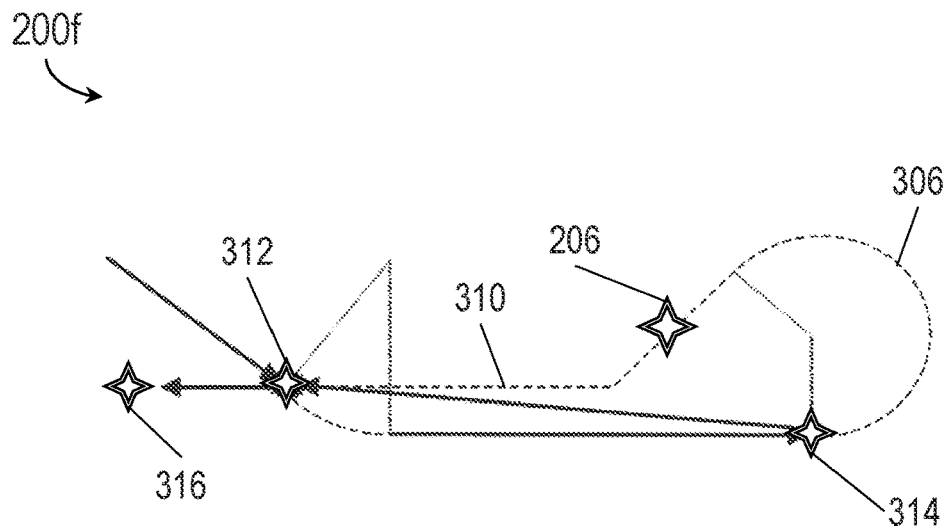

Referring in particular to FIG. 3F, in embodiments the dynamic route 200f may be associated with a procedure hold (e.g., type "proc hold") defined by entry/exit waypoint 312, "fly-over" waypoint 314, and subsequent waypoint 316 associated with a projected time after the aircraft (100, FIG. 1) has left the procedure hold. For example, projected points 206 may be projected based on arcuate track changes 306 and straight segments 310 based on, e.g., whether the projected point is between entry point 312 and waypoint 314, between waypoint 314 and exit point 312, or between exit point 312 and subsequent waypoint 316.

Figure 3G:
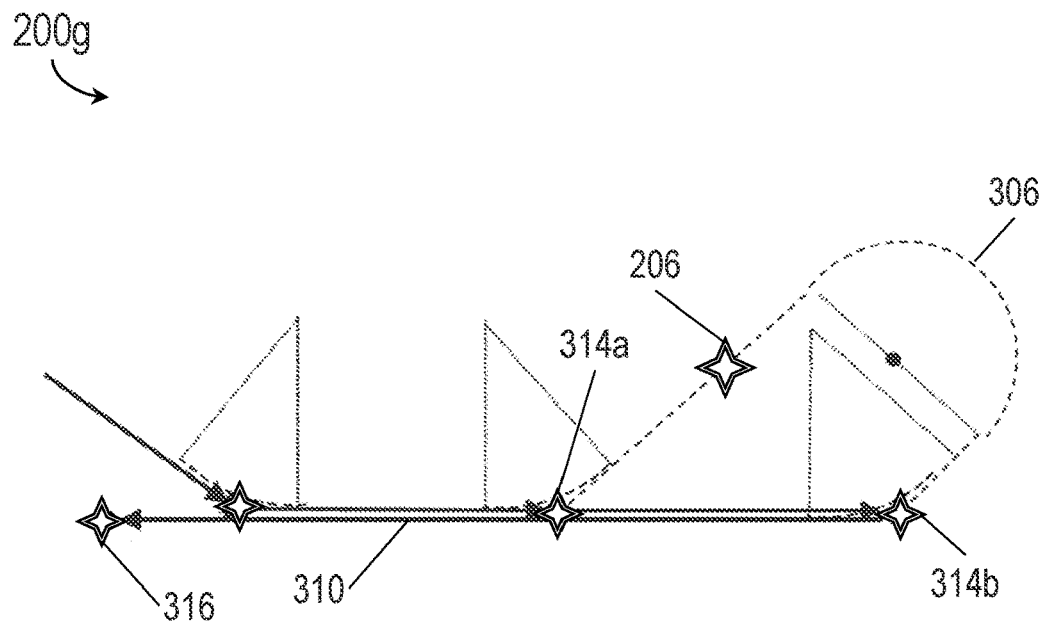

Referring in particular to FIG. 3G, in embodiments the dynamic route 200g may be associated with a procedure turn (e.g., type "proc turn") defined by entry point 312, "fly-by" waypoints 314a, 314b having track changes substantially not more than 135 degrees and subsequent waypoint 316. For example, projected points 206 may be projected based on arcuate track changes 306 and straight segments 310 based on, e.g., whether the projected point is between entry point 312 and waypoint 314a, between waypoints 314a and 314b, or between waypoint 314b and subsequent waypoint 316.

Figure 3H:
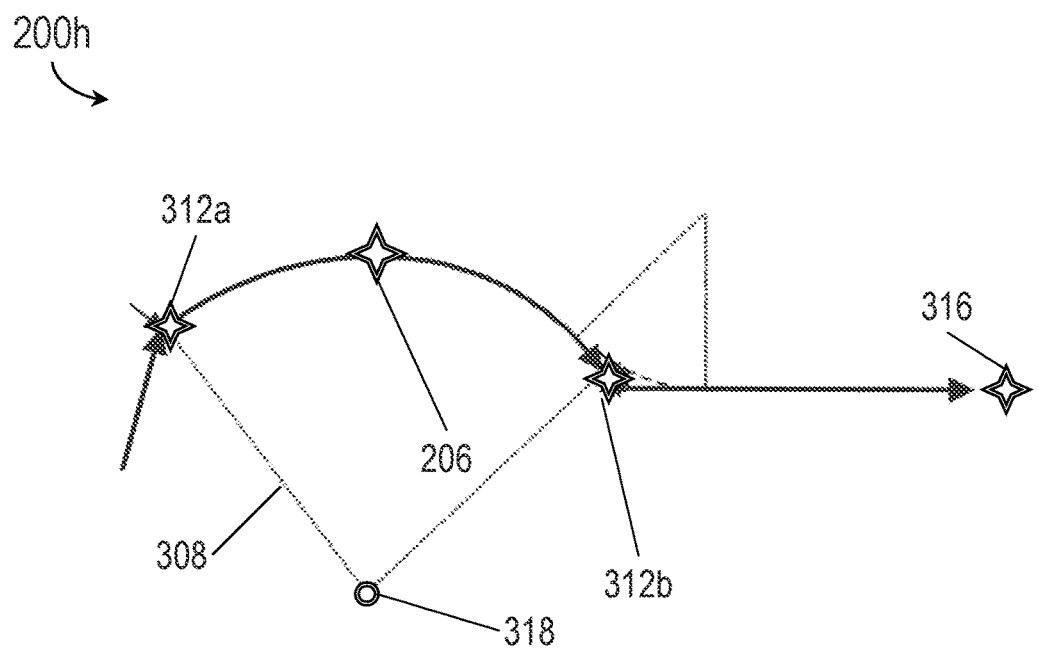

Referring in particular to FIG. 3H, in embodiments the dynamic route 200h may be associated with a radius-to-fix leg (e.g., type "RF leg") defined by fixed point 318 (e.g., "fix"), turn radius 308, entry and exit waypoints 312a, 312b (the latter transitioning between arcuate track change 306 and straight track segment 310) and subsequent waypoint 316.

Figure 4A:
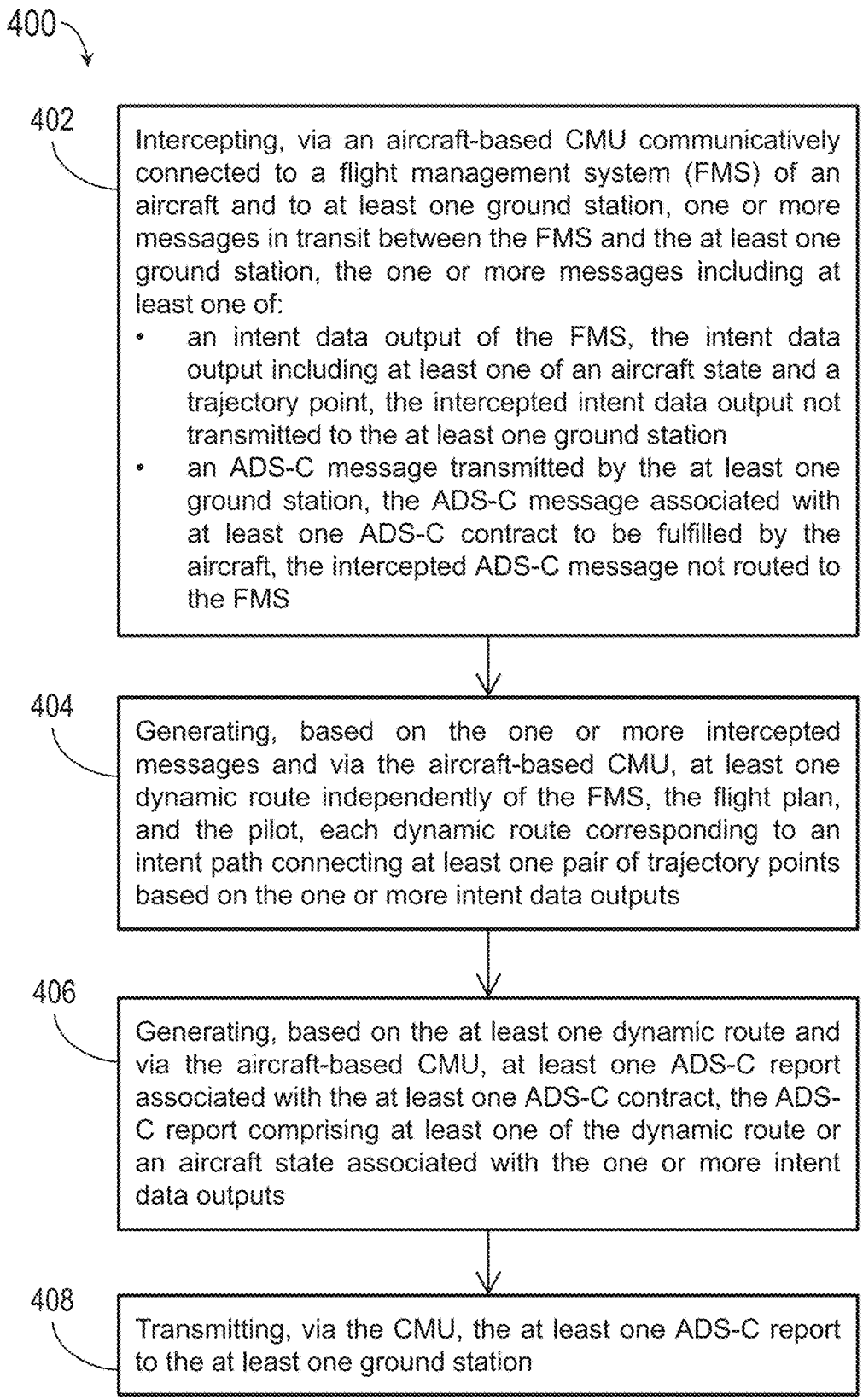

Referring now to FIG. 4A, the method 400 may be implemented by the aircraft-based communications management unit 104 (CMU) and may include the following steps.

At a step 402, the CMU receives (e.g., intercepts, blocks further transmission of) intent data outputs sent by the flight management system (FMS) to a ground control station, each intent data output including an aircraft state (e.g., a four-dimensional position of the aircraft: latitude, longitude, altitude, ETA at destination) and one or more trajectory points (intent path information, e.g., lateral or vertical path transition and (e.g., for lateral path transitions) a turn direction and turn radius (e.g., a radius relative to a fix around which the aircraft turns)). For example, each intent data output may correspond to a waypoint within the flight plan, e.g., an ATC waypoint associated with a fixed location (a "fly-by" or "fly-over" waypoint), an inserted waypoint added to a flight plan of the aircraft via the FMS (e.g., by the pilot), and/or a dynamic or pseudo-waypoint associated with a programmed change to one or more flight parameters. Alternatively, the CMU intercepts Automated Dependent Surveillance Contract (ADS-C) messages sent from a ground control station to the FMS (e.g., and prevents said ADS-C messages from being routed to the FMS), wherein each ADS-C message is associated with an ADS-C contract between the ground station and the aircraft.

At a step 404, the CMU generates a dynamic route (e.g., route representation, route approximation) based on the received intent data outputs, wherein each dynamic route describes a trajectory connecting the sequence of aircraft states included in the intent data outputs. Dynamic routes are generated independently of the FMS, the flight plan (e.g., stored by the FMS but not accessible to the CMU), or the pilot. For example, the CMU may convert absolute position information (e.g., latitude, longitude, altitude, ETA) associated with each intent data output into relative position information, where each intent data output includes an aircraft state relative to a baseline aircraft state or position. In some embodiments, the CMU may infer waypoints along the dynamic route based on the available intent data outputs.

At a step 406, the CMU generates ADS-C reports based on the dynamic route, e.g., based on ADS-C contracts initiated with the aircraft by ATC ground station/s or in response to intercepted ADS-C messages transmitted by the ground stations. Each ADS-C report corresponds to a current and/or future state of the aircraft as indicated by (or as projected based on) the dynamic route. For example, the CMU may generate periodic ADS-C reports based on periodic contracts established with ATC ground station/s. Additionally or alternatively, the CMU may receive demand contracts from the ATC ground station/s and generate ADS-C reports responsive thereto. ADS-C reports may include basic information, e.g., latitude, longitude, altitude, timestamp, or additional specific information groups as requested by an ADS-C contract. In some embodiments, the CMU determines a projected position of the aircraft at a requested subsequent time and/or a projected route, e.g., a sequence of waypoints between the current state or position of the aircraft and the projected position at the requested time.

At a step 408, the CMU transmits the generated ADS-C report/s to the requesting ATC ground station/s.

Referring also to FIG. 4B, the method 400 may include an additional step 410. At the step 410, the CMU queries absolute positioning systems (e.g., main and backup GNSS receivers) and inertial reference systems (IRS, e.g., main and backup air data inertial reference units (ADIRU)) to verify the availability and/or accuracy of aircraft navigational systems, such that each generated ADS-C report includes a navigational status accuracy assessment (e.g., estimated position uncertainty).

Referring also to FIG. 4C, the method 400 may include an additional step 412. At the step 412, the CMU detects, based on the dynamic route, a contract event associated with an event-based ADS-C contract (e.g., the event based on a deviation by the aircraft beyond one or more parameters set by the ADS-C contract). For example, the event-based contract provides that when a particular flight parameter is met or exceeded (or deceeded), an ADS-C report will be generated documenting the exceeded/deceeded parameter and transmitted to the initiating ground station/s. Accordingly, the CMU identifies any such event from within the dynamic trajectory set, generating and transmitting the appropriate report.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft-based communications management unit (CMU) device configured for control of uplink and downlink communications between an aircraft and at least one ground station, the CMU device comprising:
   an input communicatively coupled to a flight management system (FMS) of the aircraft via a trajectory bus, the FMS configured to store a flight plan of the aircraft and to accept control input from a pilot of the aircraft;
   at least one communications interface communicatively couplable to the at least one ground station via one or more aircraft-based datalink radios;
   and,
   at least one processor communicatively coupled to the input and to the at least one communications interface, the at least one processor configured to:
   intercept one or more messages in transit between the FMS and the at least one ground station, the one or more messages including at least one of:
   an intent data output transmitted by the FMS via the trajectory bus, the intent data output including at least one of an aircraft state and a trajectory point, wherein an intercepted intent data output is not transmitted to the at least one ground station;
   or
   an Automated Dependent Surveillance-Contract (ADS-C) message transmitted by the at least one ground station, the ADS-C message associated with at least one ADS-C contract to be fulfilled by the aircraft, wherein an intercepted ADS-C message is not routed to the FMS;
   based on the one or more intercepted messages, generate at least one dynamic route independently of the FMS, the flight plan, and the pilot, the at least one dynamic route corresponding to an intent path connecting at least one pair of trajectory points based on the one or more intent data outputs;
   generate, based on the at least one dynamic route, at least one ADS-C report associated with the at least one ADS-C contract, the ADS-C report comprising at least one of the dynamic route or an aircraft state associated with the one or more intent data outputs; and
   transmit the at least one ADS-C report to the at least one ground station via the at least one communications interface and the one or more datalink radios.

2. The aircraft-based CMU device of claim 1, wherein:
   the one or more intent data outputs include at least one waypoint selected from a group including:
   an air traffic service (ATS) waypoint corresponding to a fixed location;
   an inserted waypoint added to a flight plan of the aircraft via the FMS;
   or
   a pseudo waypoint associated with a programmed change to one or more flight parameters.

3. The aircraft-based CMU device of claim 1, wherein:
   the CMU device is in communication with one or more of an aircraft-based absolute positioning system and an aircraft-based inertial reference system (IRS);
   wherein the CMU device is configured for assessing a navigational accuracy of the aircraft by querying, independently of the FMS, one or more of an aircraft-based absolute positioning system and an aircraft-based inertial reference system;
   and
   wherein the at least one ADS-C report includes a navigational accuracy status report associated with the one or more of an aircraft-based absolute positioning system and an aircraft-based inertial reference system.

4. The aircraft-based CMU device of claim 1, wherein the at least one ADS-C report includes at least one periodic ADS-C report associated with a periodic ADS-C contract providing a predetermined reporting rate for transmission of the at least one periodic ADS-C report.

5. The aircraft-based CMU device of claim 1, wherein:
   the at least one ADS-C contract includes at least one event contract defining at least one flight event associated with a deviation by the aircraft beyond a parameter set by the event contract;
   and
   the at least one processor is configured for:
   detecting, based on the at least one dynamic route and independent of the FMS, the at least one flight event;
   and
   generating at least one ADS-C report responsive to the detected flight event.

6. The aircraft-based CMU device of claim 3, wherein:
   the ADS-C message corresponds to an ADS-C demand contract from the at least one ground station, the ADS-C demand contract requesting at least the aircraft state and the navigation accuracy status report;
   and
   wherein the at least one processor is configured to generate the at least one ADS-C report responsive to the ADS-C demand contract.

7. The aircraft-based CMU device of claim 6, wherein:
   the at least one ADS-C demand contract requests at least one projected position of the aircraft at a subsequent time;
   the at least one processor is configured to determine, based on the at least one dynamic route, the at least one projected position;
   and
   the at least one ADS-C report includes the at least one determined projected position.

8. The aircraft-based CMU device of claim 7, wherein:
   the at least one processor is configured to determine, based on the at least one dynamic route and the at least one projected position, at least one projected route between a current aircraft state and the at least one projected position, the projected route including one or more intermediate points.

9. A method for Automated Dependent Surveillance-Contract (ADS-C) fulfillment via an aircraft-based communications management unit (CMU), the method comprising:
intercepting, via an aircraft-based CMU communicatively connected to a flight management system (FMS) of an aircraft and to at least one ground station, one or more messages in transit between the FMS and the at least one ground station, the one or more messages including at least one of:
an intent data output of the FMS, the intent data output including at least one of an aircraft state and a trajectory point, the intercepted intent data output not transmitted to the at least one ground station;
or
an Automated Dependent Surveillance-Contract (ADS-C) message transmitted by the at least one ground station, the ADS-C message associated with at least one ADS-C contract to be fulfilled by the aircraft, the intercepted ADS-C message not routed to the FMS;
generating, based on the one or more intercepted messages and via the aircraft-based CMU, at least one dynamic route independently of the FMS, the flight plan, and the pilot, each dynamic route corresponding to an intent path connecting at least one pair of trajectory points based on the one or more intent data outputs;
generating, based on the at least one dynamic route and via the aircraft-based CMU, at least one ADS-C report associated with the at least one ADS-C contract, the ADS-C report comprising at least one of the dynamic route or an aircraft state associated with the one or more intent data outputs;
and
transmitting, via the CMU, the at least one ADS-C report to the at least one ground station.

10. The method of claim 9, wherein generating, based on the one or more intercepted messages and via the aircraft-based CMU, at least one dynamic route independently of the FMS, the flight plan, and the pilot, each dynamic route corresponding to a trajectory connecting two or more aircraft states associated with the one or more intent data outputs includes:
inferring, via the CMU, at least one waypoint based on the one or more intent data outputs.

11. The method of claim 9, further comprising:
assessing, via the aircraft-based CMU and independent of the FMS, a navigational accuracy of the aircraft by querying one or more of an aircraft-based absolute positioning system and an aircraft-based inertial reference system;
wherein generating, based on the at least one dynamic route and via the aircraft-based CMU, the at least one ADS-C report includes generating a navigational accuracy status report associated with the one or more of an aircraft-based absolute positioning system and an aircraft-based inertial reference system.

12. The method of claim 9, wherein generating, based on the at least one dynamic route and via the aircraft-based CMU, the at least one ADS-C report includes:
generating at least one periodic ADS-C report associated with a periodic ADS-C contract, the at least one periodic ADS-C contract providing a predetermined reporting rate for transmission of the at least one periodic ADS-C report.

13. The method of claim 9, further comprising:
detecting, via the CMU and based on the at least one dynamic route, at least one contract event defined by the at least one ADS-C event contract between the aircraft and the at least one ground station, the at least one contract event corresponding to a deviation by the aircraft beyond a parameter set by the ADS-C event contract;
wherein generating, based on the at least one dynamic route and via the aircraft-based CMU, the at least one ADS-C report includes generating at least one ADS-C event report corresponding to the detected contract event.

14. The method of claim 11, wherein the intercepted ADS-C message is an ADS-C demand contract from the at least one ground station;
and
wherein generating, based on the at least one dynamic route and via the aircraft-based CMU, the at least one ADS-C report includes generating at least one ADS-C report responsive to the demand contract, the ADS-C report including at least the aircraft state and the navigation accuracy status report.

15. The method of claim 9, wherein generating, based on the one or more intercepted messages and via the aircraft-based CMU, at least one dynamic route independently of the FMS, the flight plan, and the pilot includes:
determining, via the aircraft-based CMU and independently fo the FMS, the flight plan, and the pilot, at least one projected position of the aircraft at a subsequent time provided by the ADS-C contract; and
wherein generating, based on the at least one dynamic route and via the aircraft-based CMU, the at least one ADS-C report includes:
generating at least one ADS-C report including the at least one determined projected position.

16. The aircraft-based CMU device of claim 1, wherein the at least one dynamic route includes a vertical projected path of the aircraft and a lateral projected path of the aircraft.

17. The aircraft-based CMU device of claim 1, wherein the at least one dynamic route includes at least one waypoint inferred by the apparatus based on the one or more intent data outputs.

18. The aircraft-based CMU device of claim 1, wherein at least one trajectory point of the at least one dynamic route is associated with at least one of a vertical path transition or a lateral path transition.

* * * * *